United States Patent [19]

Nakamoto et al.

[11] 4,400,954
[45] Aug. 30, 1983

[54] STEERING LOCK ASSEMBLY

[75] Inventors: Hiromasa Nakamoto; Akiyoshi Mentani, both of Hiroshima, Japan

[73] Assignees: Toyo Kogyo Co., Ltd, Hiroshima; Yuhshin Co., Ltd., Tokyo, both of Japan

[21] Appl. No.: 251,281

[22] Filed: Apr. 6, 1981

[30] Foreign Application Priority Data

Apr. 5, 1980 [JP] Japan .............................. 55-46173[U]

[51] Int. Cl.³ ............... B60R 25/02; E05B 29/02; E05B 65/12
[52] U.S. Cl. ...................... 70/186; 70/252; 70/370; 70/377
[58] Field of Search ............... 70/252, 186, 370, 367, 70/377, 375, 372, 376, DIG. 62

[56] References Cited

U.S. PATENT DOCUMENTS

| | | | |
|---|---|---|---|
| 1,805,891 | 5/1931 | Shinn | 70/377 X |
| 1,850,323 | 3/1932 | Heyer | 70/377 X |
| 1,900,794 | 3/1933 | Brun | 70/DIG. 62 |
| 1,990,934 | 2/1935 | Falk | 70/369 |
| 3,520,161 | 7/1970 | Jacobi | 70/372 X |
| 3,566,635 | 3/1971 | Wolter | 70/252 |
| 3,641,489 | 2/1972 | Shimomura | 70/252 X |
| 3,782,145 | 1/1974 | Wolter | 70/186 |
| 3,794,796 | 2/1974 | Dwan | 70/252 X |
| 3,840,714 | 10/1974 | Arman | 70/252 X |

FOREIGN PATENT DOCUMENTS

| | | | |
|---|---|---|---|
| 817017 | 7/1969 | Canada | 70/377 |
| 1555292 | 8/1970 | Fed. Rep. of Germany | 70/252 |
| 2035282 | 1/1972 | Fed. Rep. of Germany | 70/252 |
| 2613208 | 10/1977 | Fed. Rep. of Germany | 70/252 |
| 1411377 | 10/1975 | United Kingdom | 70/252 |
| 2018882 | 10/1979 | United Kingdom | 70/252 |

*Primary Examiner*—Cornelius J. Husar
*Assistant Examiner*—Carl F. Pietruszka
*Attorney, Agent, or Firm*—Wenderoth, Lind & Ponack

[57] ABSTRACT

A steering lock assembly for use in an automobile comprises a cylinder lock for controlling an ignition switch assembly with a mating key inserted in the cylinder lock and a steering shaft lock operatively associated with the cylinder lock for selectively locking and unlocking an automobile steering shaft. The cylinder lock comprises a key-operated barrel and the steering shaft lock comprises a locking member. A retaining mechanism is also provided for temporarily holding the locking member in an unlocked position unless the key inserted in the barrel is withdrawn and comprises a locking link. This locking link is operatively accommodated in an elongated chamber in a lock housing and can be held in position inside the elongated chamber by inserting it in an axial direction of the barrel.

9 Claims, 11 Drawing Figures

STEERING LOCK ASSEMBLY

BACKGROUND OF THE INVENTION

The present invention generally relates to a steering lock assembly and, more particularly, to a steering lock assembly of a type utilizing a cylinder lock and a steering shaft lock operatively associated with the cylinder lock for selectively locking and unlocking an automobile steering shaft.

The British Pat. No. 1,512,809, published on June 1, 1978, discloses a steering column lock wherein a cam member for transmitting a rotation of a barrel forming a key plug part of the cylinder lock to a locking member for selectively locking and unlocking an automobile steering shaft is integrally formed with the barrel. However, the cam member used therein is of a size larger in diameter than that of the barrel and, therefore, assembly of the cylinder lock used therein necessitates the employment of a separate sleeve as the outer cylinder lock part for rotatably accommodating therein the barrel. This patent also discloses the employment of a retaining mechanism for retaining the locking member in an unlocked position once the locking member has been moved thereto by the cam member in response to the rotation of the barrel in one direction and so long as the key is not removed or withdrawn from the barrel even though the latter has subsequently been rotated in the reverse direction back to the original position, but permitting the locking member to return to a locked position upon withdrawal of the key from the cylinder lock. This retaining mechanism employed therein comprises a spring-loaded plunger, the operation of which is controlled by an axial movement of the barrel.

The cylinder lock which does not require the use of the cylinder outer or sleeve is disclosed, for example, in the British Pat. No. 1,455,444, published on Nov. 10, 1976. However, since this patent is directed to means for preventing a subassembly of the cylinder with the barrel of the cylinder lock from being removed by an unauthorized person, this patent is silent as to the details of how the cylinder lock is operatively associated with the locking member and also the details of the bolt retaining mechanism.

Figure 1:
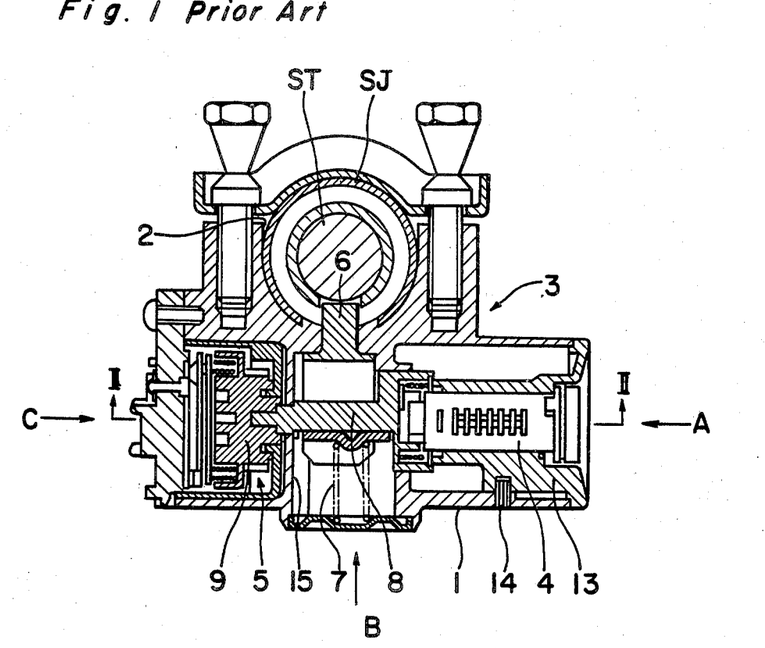
FIG. 1 is a longitudinal sectional view of the prior art steering lock assembly.
Figure 2:
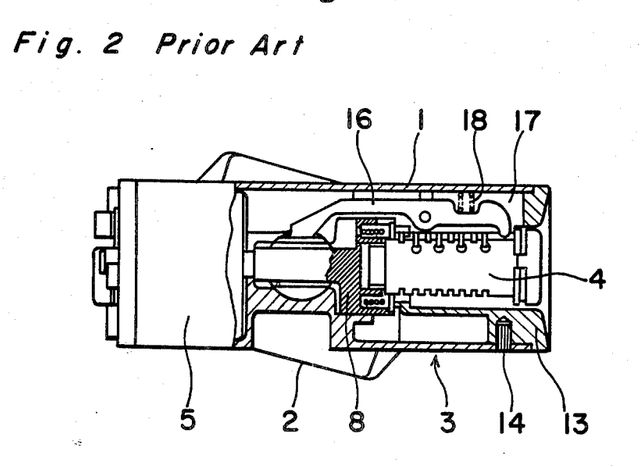
FIG. 2 is a cross sectional view taken along the line II—II in FIG. 1.

An example of prior art steering lock assembly which appears more pertinent to the present invention is shown in FIGS. 1 and 2 of the accompanying drawings in a longitudinal sectional view and a cross-sectional view taken along the line II—II in FIG. 1, respectively.

Referring to FIG. 1, the prior art steering column lock assembly shown therein comprises a lock housing 3 including a cylindrical block 1 and a generally U-shaped mounting block 2 through which the lock assembly is secured to an automobile steering column in which a steering shaft rotatably extends. The cylindrical block 1 accommodates a cylinder lock 4 at one end thereof and an ignition switch assembly 5 at the opposite end thereof and also accommodates a semi-circularly cross-sectioned locking bolt 6, which can selectively protrude into and retract from the U-shaped recess in the mounting block in a direction perpendicular to the longitudinal axis of the cylindrical cylinder block 1 respectively for locking and unlocking the steering shaft, which locking bolt 6 is located within an intermediate space between the cylinder lock 4 and the ignition switch assembly 5. This locking bolt 6 is normally biased by a compression spring 7 so as to assume a locked position in which the locking bolt protrudes into the U-shaped recess to lock the steering shaft and is operatively coupled to a cam member 8 rotatable together with the key plug part of cylinder lock 4, said cam member 8 having an actuating projection integrally formed therewith and operatively coupled to a rotor 9 of the switch assembly 5 for controlling the latter according to the direction of rotation of the key plug cylinder lock 4 which is effected by turning a mating key inserted in the cylinder lock 4.

The prior art lock assembly also comprises a retaining mechanism for retaining the locking bolt 6 in an unlocked position once the locking bolt 6 has been moved thereto by the rotation of the key plug of cylinder lock 4 in one direction and so long as the key is not removed or withdrawn from the cylinder lock 4 even though the latter has subsequently been rotated in the reverse direction back to the original position, but permitting the locking bolt 6 to return to a locked position upon withdrawal of the key from the cylinder lock.

In the construction described above and shown in FIG. 1, a relatively complicated and time-consuming procedure is required to assembly the various component parts together to provide a complete steering lock assembly. By way of example, relative to the cylindrical block 1, the cam member 8 and the cylinder lock 4 are successively subassembled and mounted in a direction shown by A from one end of the cylindrical block 1, the locking bolt 6 and the compression spring 7 are successively mounted in a direction shown by B, and the ignition switch assembly 5 is mounted in a direction shown by C and counter to the mounting direction A. This three-direction assembly system requires not only the complicated and time-consuming assemblying procedure, but also the increased number of the component parts of the lock assembly which in turn results in the increased weight of the lock assembly.

Specifically, the three-direction assembly system requires the use of separate fixing elements or fixtures to hold the respective component parts in position and, depending on the arrangement of the fixtures, some component part of the lock assembly has to be made of separate members. This will be explained by way of example with still reference to FIG. 1.

In order to secure a sufficient stroke of movement of the locking bolt 6 between the locked and unlocked positions, the cylinder lock 4 and the cam member 8 have to be made of separate members and such is the case with the prior art lock assembly shown in FIG. 1. In addition, in order to connect the cylinder lock 4 effectively with the cam member 8 so that the rotation of the key plug in cylinder lock 4 can be transmitted to the locking bolt 6 through the cam member 8, that portion of the cam member 8 which is connected to the cylinder lock 4 must be of a relatively large diameter, requiring the employment of a relatively large chamber in the cylinder block 1 for the accommodation of the cylinder lock subassembly so that the cam member 8 can be inserted into the intermediate space through the large chamber. The employment of the large chamber for the cylinder lock 4 necessitates the employment of a cylinder outer or sleeve 13. The outer cylinder or sleeve 13 forms a discrete part of the cylinder lock 4 together with a barrel rotatably housed within the sleeve 13 and is, after having been inserted into the large bore in the cylindrical block 1, held in position by means of one or more cotter pins 14. Furthermore, in order to retain the ignition switch assembly 5 in position inside the cylindrical block 1 at a position on one side of the locking bolt 6 opposite to the cylinder lock 4, the lock housing 3 is required to be formed with a partition wall 15 separating the intermediate space from a chamber for the ignition switch assembly 5 and to which the ignition switch assembly 5 is, after having been inserted into such chamber, engaged to assume a proper position inside the cylindrical block 1.

As best shown in FIG. 2, the retaining mechanism employed in the steering lock assembly shown in FIG. 1 comprises a locking lever 16. This locking lever 16 is movably accommodated within a slot 17 defined in the cylinder 13 and extending in a substantially intermediate portion of said cylinder 13 in a direction axially thereof, said slot 17 extending completely through the thickness of the wall of the cylinder 13. This locking lever 16 is held in position inside the slot 17 by inserting it exteriorly of the cylinder 13 together with a biasing spring 18 prior to the cylinder outer or sleeve 13 being inserted into the chamber in the cylindrical block 1 together with the barrel.

The particular configuration of the locking lever 16 employed therein constitutes an additional reason that the use of the discrete cylinder 13 is essential in the construction shown in FIGS. 1 and 2.

In addition thereto, considering the method for mounting the locking link 16 together with the biasing spring 18 on the cylinder 13, since the locking lever 16 is not fixed, but movably supported in the slot 17 and since the locking lever 16 within the slot 17 is spring-loaded, there is a possibility that the locking lever 16 may jump or scatter out of the slot 17 during the insertion of the assembly of the component parts of the cylinder lock 4 into the chamber in the cylindrical block 1.

As hereinbefore discussed, the prior art construction shown in FIGS. 1 and 2 requires the complicated and time-consuming procedure to assembly the steering column lock assembly.

SUMMARY OF THE INVENTION

Accordingly, the present invention has been developed with a view to substantially eliminating the disadvantages and inconveniences inherent in the prior art steering lock assemblies and is intended to provide an improved steering lock assembly which does not require a complicated and time-consuming assemblying procedure and can readily be assembled with the minimized number of component parts.

Another important object of the present invention is to provide an improved steering lock assembly of the type referred to above, which is reliable in performance and can be manufactured at a substantially reduced cost.

According to the present invention, there is provided a steering lock comprising a lock housing including a generally cylindrical cylinder block having an axial bore defined therein, said axial bore being constituted by an integral cylinder chamber, an intermediate chamber and a switch chamber all axially aligned with each other, and a generally U-shaped mounting block having a guide opening defined therein in communication with the intermediate chamber and movably supporting a locking member for selectively locking and unlocking an automobile steering shaft. The cylinder chamber is the cylinder lock cylinder and accommodates therein a cylinder lock key plug part which includes a barrel and a generally elongated cam member integrally formed therewith and protruding from one end of the barrel into the switch chamber across the intermediate chamber for engagement with a rotor of a key-operated switch assembly housed within the switch chamber.

The cam member integral with the barrel controls a movement of a slide member between locked and unlocked positions in such a way that, when a mating key inserted in the barrel is rotated from an inoperative position towards an operative position and from the operative position back towards the inoperative position, the slide member is moved from the unlocked position towards the locked position and from the locked position back towards the unlocked position, respectively. Since the slide member is coupled with the locking member for movement together therewith, the locking member is held in position to lock the steering shaft when the slide member is in the locked position and in position to unlock the steering shaft when the slide member is in the unlocked position.

A retaining mechanism is also provided for retaining the slide member in the unlocked position once the slide member has been moved thereto by the rotation of the barrel from the inoperative position to the operative position and so long as the key is not removed or withdrawn from the cylinder lock even though the barrel has subsequently been rotated from the operative position to the inoperative position, but releasing the slide member from the unlocked position to allow it to move towards the locked position upon withdrawal of the key from the cylinder lock. As is the case with the prior art steering lock assembly of the construction described with reference to and shown in FIGS. 1 and 2, the retaining mechanism comprises a locking lever.

For accommodating the locking lever, according to the present invention, the cylindrical block has a generally elongated chamber extending axially of the cylinder block in communication with the cylinder chamber. This elongated chamber has first and second open ends opposite to each other, the first open end opening at the annular end face of the cylinder block opposite from the switch chamber and the second open end opening into the intermediate chamber. Subsequent to the insertion of the barrel into the cylinder chamber, the locking lever can be held in position inside the elongated chamber by inserting it into the elongated chamber through the first open end thereof exteriorly of the cylindrical block and in a direction axially facing towards the intermediate chamber.

In the construction according to the present invention, the lock assembly can be fabricated by inserting the barrel with the cam member into the cylinder chamber through both the switch chamber and the intermediate chamber, then inserting the slide member into the intermediate chamber together with a biasing spring through the switch chamber after the locking member is inserted through the guide opening so as to permit an inner end of the locking member to be coupled to the slide member being inserted, and finally inserting the key-operated switch assembly into the switch chamber with the free end of the cam member engaged in the rotor. The insertion of the locking lever into the elongated chamber can be effected either subsequent to the insertion of the barrel into the cylinder chamber or after the switch assembly has been inserted into the switch chamber.

While the cam member when held in position inside the intermediate chamber concurrently serves as means for avoiding any possible axial displacement of the barrel in a first direction away from the switch chamber in addition to means for transmitting the rotation of the barrel to the slide member, the barrel carries means for avoiding any possible axial displacement of the barrel in the other direction opposite to the cylinder chamber.

Thus, it is clear that, according to the present invention, essential and important component parts of the steering column lock assembly can be fabricated or assembled readily and easily into the cylindrical block. Therefore, as compared with the three-direction assembly system referred to above, the number of the separate component parts of the lock assembly can advantageously be minimized with consequent reduction in weight and manufacturing cost.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF EMBODIMENT

Before the description of the present invention proceeds, it is to be noted that like parts are designated by like reference numerals throughout the accompanying drawings except for FIGS. 1 and 2.

Figure 3:
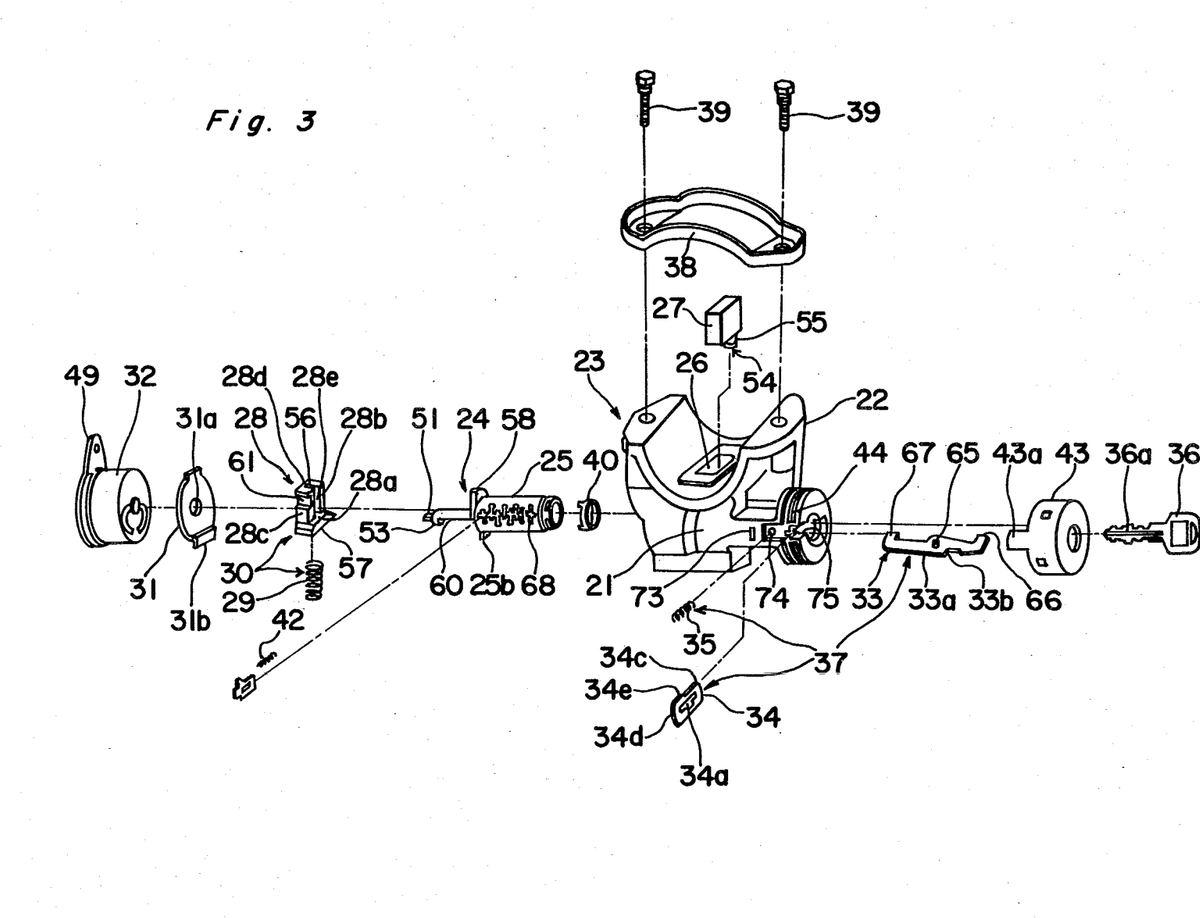
FIG. 3 is an exploded view of a steering lock assembly embodying the present invention.
Figure 4:
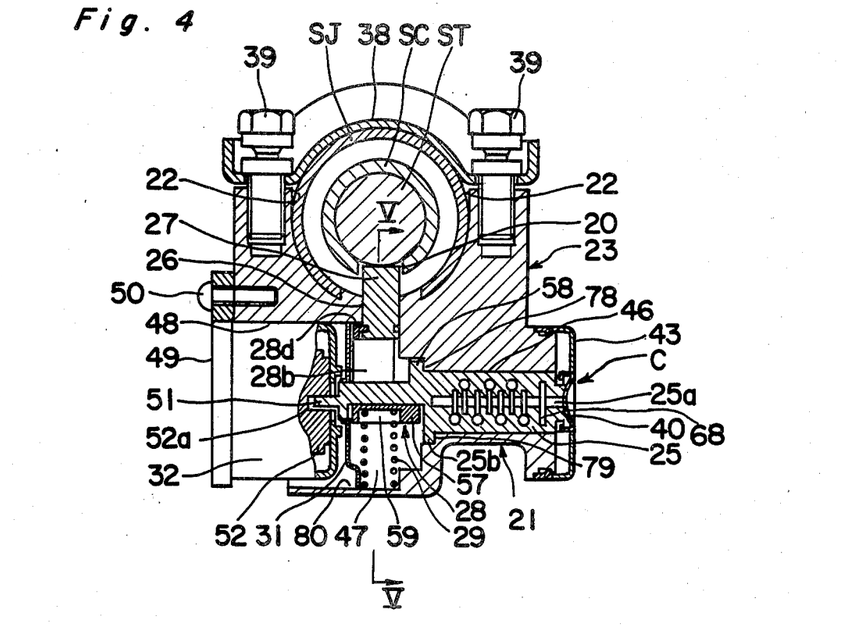
FIG. 4 is a longitudinal sectional view of the steering lock assembly shown in FIG. 3.

Referring first to FIGS. 3 and 4, a steering lock embodying the present invention basically comprises a lock housing 23 made of metal and formed into one-piece construction together with a generally cylindrical cylinder block 21, having an axial bore defined therein and composed of a cylinder chamber 46, an intermediate chamber 47 and a switch chamber 48 all coaxially communicated with each other, and a generally U-shaped or semicircularly cross-sectioned mounting block 22 protruding laterally outwardly from the cylindrical block 21; the barrel of a cylinder lock key plug C housed in the cylinder chamber 46 and carrying a cam member 24 protruding axially therefrom towards the switch chamber 48 across the intermediate chamber 47; an elongated locking bolt or member 27 for selectively locking and unlocking an automobile steering shaft ST; a drive device 30 comprising a slide member 28 housed within the intermediate chamber 47 for movement between locked and unlocked positions together with the locking bolt 27 in a direction perpendicular to the longitudinal extent of the cylinder block 21 and a biasing spring 29 for urging the slide member 28 towards the locked position; a partition wall member 31 fixedly positioned between the intermediate chamber 47 and the switch chamber 48 and forming a guide wall for guiding the movement of the slide member 28; a key-operated rotary switch assembly 32 of any known construction fixedly housed within the switch chamber 48 and having a rotor coupled to the cam member 24 for rotation together therewith; and a retaining mechanism 37 positioned within the cylinder and across chamber 46 and movable generally laterally of the cylinder lock key plug C for retaining the slide member 28 in the unlocked position together with the locking member 27 once said slide member 28 has been moved thereto by the rotation of the cylinder lock key plug C in one direction with a mating key 36 inserted in said cylinder lock key plug C and so long as the key 36 is not removed or withdrawn from the cylinder lock key plug C even though the latter has subsequently been rotated in the reverse direction back to the original position, said retaining mechanism including a locking lever 33, a generally elongated slidable plate 34 and a biasing spring 35.

The lock housing 23 is, in a manner as is well known to those skilled in the art, fixedly mounted on a steering column SJ by the use of a clamp member 38 secured to the mounting block 22 by means of set bolts 39 while the steering column SJ with the steering shaft ST extending coaxially therethrough extends through a circular opening defined between the mounting block 22 and the clamp member 38. This lock housing 23 so far illustrated is so designed that, when the steering lock is mounted on the steering column SJ in the manner as hereinbefore described, the longitudinal extent of the cylinder block 21 lies in a plane at right angles to that of the steering shaft ST rotatably extending inside the steering column SJ. The steering shaft ST has a collar SC rigidly mounted thereon for rotation together therewith, said collar SC having a detent recess 20 defined therein for receiving the locking bolt 27, when the latter is moved to the locked position, to lock the steering shaft ST in a neutral position in a manner as will be described later.

As is the case with the conventional cylinder lock, the cylinder lock key plug C comprises a barrel 25 having a key groove 25a defined therein and extending inwardly from one end face thereof opposite to the intermediate chamber 47, said barrel 25 also having a plurality of, for example, seven, pairs of tumbler plates 41 and their associated return springs 42, each of said tumbler plates 41 being movable in a direction perpendicular to the key groove 25a between engaged and disengaged positions and being normally biased to assume the engaged position by the action of the corresponding spring 42. These tumbler plates 41 are so designed and so sized that, in the absence of the key 36 in the key groove 25a, all of the tumbler plates 41 are biased by the associated springs 42 to the respective engaged positions with their ends engaged in an axial groove (not shown) defined in the wall of the cylindrical block 21 facing the cylinder chamber 46 thereby to hold the barrel 25 against rotation relative to the cylinder part provided by block 21, said tumbler plates 41 being, however, moved to the respective disengaged positions against the associated return springs 42, when the mating key 36 is inserted into the key groove 25a, to permit the barrel 25 to be rotatable together with the mating key 36. Although the cylinder lock key plug C itself may be of any known construction, the barrel 25 employed therein according to the present invention is formed integrally with, and therefore, is of one-piece construction together with the cam member 24 of a construction as will be described later.

The cam member 24 is constituted by an elongated cam body 60 of generally semi-circular cross section having one end integral with the barrel 25 and formed with a radially outwardly extending cam projection 58 engageable with the slide member 28 in a manner as will be described later, the other end of said cam body 60 being formed integrally with a support disc 53 which is integrally formed with an actuator projection 51 protruding therefrom in a direction opposite to the barrel 25 in coaxial relation to the longitudinal axis of the barrel 25. The actuator projection 51 is in turn engaged in an engagement recess 52a defined in the rotor 52 of the rotary switch assembly 32 so that the rotor 52 can be rotatable together with the barrel 25. By the reason as will become clear from the subsequent description, the barrel 25 has a stopper projection 25b radially outwardly protruding from the end of the barrel 25 adjacent the cam member 24, which stopper projection 25b so far illustrated is positioned in opposite relation to the cam projection 58.

Figure 11:
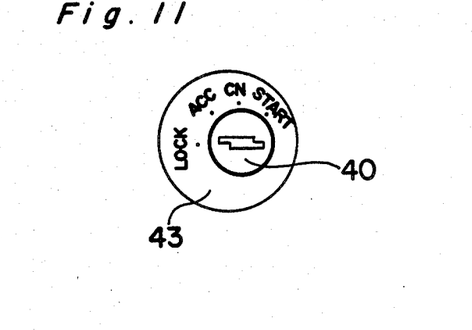
FIG. 11 is a front end elevational view of the cylindrical block showing a cylinder cap and a decorative covering.

The cylinder lock key plug C of the construction described above is, after having been inserted through the switch chamber 48 and then through the intermediate chamber 47 with the end cap 40 pointed towards the cylinder chamber 46, held in position inside the cylinder chamber 46. When the cylinder lock key plug C is so held in position inside the cylinder chamber 46 as best shown in FIG. 4, not only is the end cap 40 exposed to the outside through one open end of the cylinder chamber 46 opposite to the intermediate chamber 47, but also the stopper projection is engaged in a generally semicircular indent defined at 79 in the cylinder block 21 and the cam projection 58 is also engaged slidingly to an annular land 78 defined in the cylinder block 21 between the cylinder chamber 46 and the intermediate chamber 47. Reference numeral 43 represents a centrally opened, decorative covering snapped onto, or otherwise crimped to, one end of the cylinder block 21 with its outer peripheral edge portion engaged in a fitting groove 44 on said one end of the cylindrical block 21. As best shown in FIG. 11, this decorative covering 43 has its outer annular face embossed or engraved with a plurality of, for example, four, legends "LOCK", "ACC.", "ON" and "START", which legends represent respective positions for the key 56 relative to the cylinder block 21 and are familiar to those skilled in the art as well as automobile drivers. It is to be noted that the semi-circular indent 79 into which the stopper projection 25b is engaged extends circumferentially of the cylinder chamber 46 through a distance corresponding to the angular distance through which the key 36 correctly inserted in the cylinder lock key plug C can be rotated between two extreme positions, that is, between the "LOCK" and "START" positions.

In the construction so far described, when the mating key 36 acceptable to the cylinder lock key plug C of a particular key combination is inserted into the key groove 25a in the barrel 25 through the key hole in the end cap 40, the barrel 25 is rotatable together with the key 36, the rotation of the barrel 25 being in turn transmitted to the rotor 52 of the rotary switch assembly 32 to bring the latter to one of a plurality of switching positions. If the key 36 is found to be incorrect with respect to the particular key combination of the cylinder lock key plug C, no one can turn the key 36 even though the latter has completely been inserted into the key groove 25a in the barrel 25 by the reason as is well known to those skilled in the art, that is, by the reason that some or all of the tumbler plates 41 fail to move to the disengaged positions in response to the insertion of the key into the key groove 25a.

Figure 5:
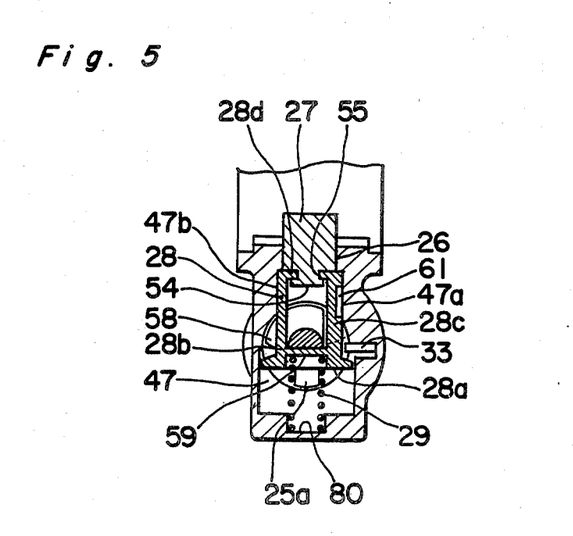
FIG. 5 is a cross sectional view taken along the line V—V in FIG. 4.

The intermediate chamber 47 accommodating therein the drive device 30 is of a generally rectangular shape having a length generally equal to the diameter of the switch chamber 48 and a width generally corresponding to the diameter of the cylinder chamber 46 as can readily be seen from FIGS. 4 and 5. This intermediate chamber 47 forming a part of the axial bore in the cylinder block 21 together with the cylinder chamber 46 and the switch chamber 48 is communicated to a generally U-shaped or semi-circularly cross-sectioned recess defined in the mounting block 22 through a guide opening 26 defined in the lock housing 23, said guide opening 26 having a cross sectional representation similar to that of the locking bolt 27. This guide opening 26 provides a passage through which the locking bolt 27 moves in response to the movement of, and together with, the slide member 28 between the locked and unlocked positions.

Figure 6:
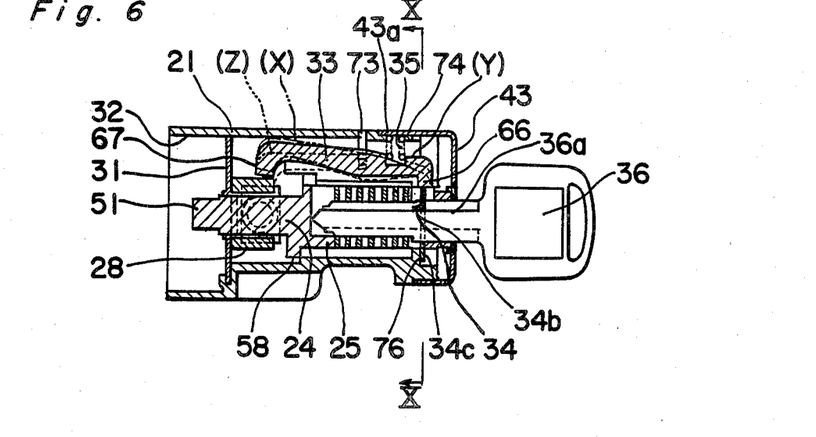
FIG. 6 is a longitudinal sectional view of a portion of the lock assembly taken at right angles to that shown in FIG. 4, showing the details of a cylinder lock.

While the cylinder chamber 46 is filled up by the barrel 25, the intermediate chamber 47 is separated from the switch chamber 48 by means of the partition wall member 31 having its outer peripheral edge portion staked to the inner wall of the cylinder block 21 facing the axial bore in a manner as best shown in FIG. 6. As best shown in FIG. 3, this partition wall member 31 is of a shape having a central opening 31a, which relatively rotatably supports the support disc 53 integral with the cam body 60, and an engagement lug 31b protruding radially outwardly therefrom for engagement in a guide groove 80 defined in the wall of the cylinder block 21 facing the axial bore. It is to be noted that a portion of the guide groove 80 within the intermediate chamber 47 serves as a spring seat for the biasing spring 29 as can readily be understood from FIG. 5.

The slide member 28 movably housed within the intermediate chamber 47 is of one-piece construction constituted by a generally rectangular base plate 28a, a top plate 28d and a pair of spaced side plates 28b and 28c connected at their opposite ends to the base and top plates 28a and 28d, said slide member 28 having a generally rectangular space 28e which is defined among the plates 28a, 28b, 28c and 28d. This slide member 28 is so housed and so positioned within the intermediate chamber 47 that, while the top plate 28d confronts the guide opening 26 and the base plate 28a traverses the guide groove 80, a major portion of the elongated cam body 60 of the cam member 24 loosely extends through the space 28e defined in the slide member 28. As hereinbefore described, this slide member 28 is normally biased by the biasing spring 29 so as to assume the locked position as shown in FIG. 5. The biasing spring 29 has one end seated in the guide groove 80 and the other end received in a spring seat 59 defined in the undersurface of the base plate 28a opposite to the space 28e as best shown in FIG. 5, and the base plate 28a is engaged to the cam body 60 when it is in the locked position.

The slide member 28 is connected to the locking bolt 27 in the following manner. The top plate 28d has a U-shaped engagement recess 56 defined therein and extending inwardly from one side edge of said top plate 28d facing the cylinder chamber 46. In other words, the U-shaped engagement recess 56 defined in the top plate 28d extends inwardly from one side edge thereof in a direction opposite to the direction in which the slide member 28 is inserted into the intermediate chamber 47 through the switch chamber 48 in a manner as will be described later.

On the other hand, the locking bolt 27 has an anchor 54 formed integrally with one end thereof and protruding therefrom in a direction facing the intermediate chamber 47. This anchor 54 has a U-shaped or annular engagement groove 55 defined therein at a position adjacent the locking bolt 27 for receiving a lip region of the U-shaped engagement recess 56 in a manner as best shown in FIG. 5. The intended connection of the locking bolt 27 with the slide member 28 can readily be carried out by inserting the locking bolt 27 into the guide opening 26 with the anchor 54 pointed towards the intermediate chamber 47 and then inserting the slide member 28 into the intermediate chamber 47 through the switch chamber 48. By so doing, the engagement recess 56 in the top plate 28d of the slide member 28 receives the anchor 54 to connect the slide member 28 to the locking bolt 27.

The base plate 28a has its front edge portion 57 protruding towards the barrel 25 as best shown in FIG. 4 for engagement with the cam projection 58 of the cam member 24. This front edge portion 57 and the cam projection 58 are so shaped and so sized that, as the barrel 25 is rotated together with the inserted key 36 being turned from the "LOCK" position towards any one of the other positions, i.e., any one of "ACC.", "ON" and "START" positions, the cam projection 58 is brought into engagement with the front edge portion 57 of the base plate 28a, thereby causing the slide member 28 to move from the locked position towards the unlocked position together with the locking bolt 27 against the biasing spring 29. During the movement of the slide member 28 between the locked and unlocked position, the slide member 28 is guided by the surrounding wall defining the intermediate chamber 47, which surrounding wall includes a portion of the partition wall member 31 and lateral opposite wall portions identified respectively by 47a and 47b in FIG. 5.

The rotary switch assembly 32 employed is of a type known as an automobile ignition switch assembly and is housed within the switch chamber 48 and fixed in position by means of one or more set bolts 50 threaded to the lock housing 23 after having passed through a terminal base 49 fast with the switch assembly 32 as shown in FIG. 4. The insertion of the switch assembly 32 into the switch chamber 48 is carried out after the barrel 25 and the slide member 28 have successively been inserted into the cylinder chamber 46 and the intermediate chamber 47 and after the partition wall member 31 has subsequently been set in position between the intermediate chamber 47 and the switch chamber 48. It will readily be seen that the actuator projection 51 fast with the cam body 60 of the cam member 24 is automatically engaged in the engagement recess 52a in the rotor 52 of the switch assembly 32 upon completion of insertion of the switch assembly 32 into the switch chamber 48.

In the construction so far described, it is clear that, since the slide member 28 is biased by the biasing spring 29, the rotation of the barrel 25 resulting from the rotation of the inserted key 36 from one of the "ACC.", "ON" and "START" positions back to the "LOCK" position allows the slide member 28 to return to the locked position with the locking bolt 27 held in position to lock the steering shaft ST. This may provide an inconvenience known to those skilled in the art as well as most automobile drivers, and an arrangement is usually desired to prevent the slide member 28, once moved to the unlocked position against the spring 29 as a result of rotation of the inserted key 36 from the "LOCK" position to any one of the other positions, from being automatically moved back to the locked position simultaneously with the reverse rotation of the inserted key 36 back to the "LOCK" position and to keep the slide member 28 in the unlocked position so long as the key 36 remains inserted in the key groove 25a and unless the inserted key 36 is withdrawn or removed out of the key groove 25a. For this purpose, the retaining mechanism 37 is employed in the steering lock embodying the present invention, the details of which will now be described with particular reference to FIGS. 3 and 6 to 10.

As best shown in FIGS. 3 and 6, the locking lever 33 has its opposite ends integrally formed with respective pawls 66 and 67 protruding in the same direction laterally therefrom generally at right angles to the longitudinal extent of said lever 33, and also has a bearing pin 65 laterally protruding from a substantially intermediate portion of said lever 33. For the purpose as will become clear from the subsequent description, the locking link 33 has one lateral edge 33a formed with a bearing recess 33b positioned substantially between the bearing pin 65 and the pawl 66 and on one side of the longitudinal axis of the link 33 opposite to the pawl 66.

Figure 7:
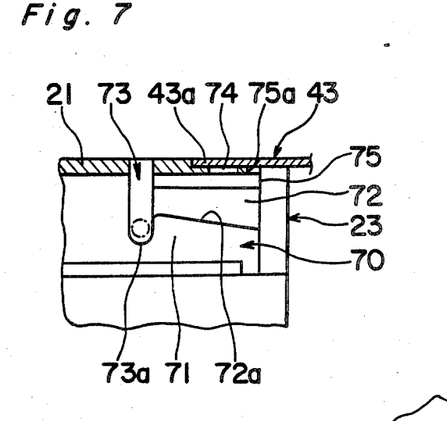
FIG. 7 is a longitudinal sectional view, on an enlarged scale, of a portion of a cylinder block of the lock assembly, showing a chamber for accommodating a lever-like detent.
Figure 8:
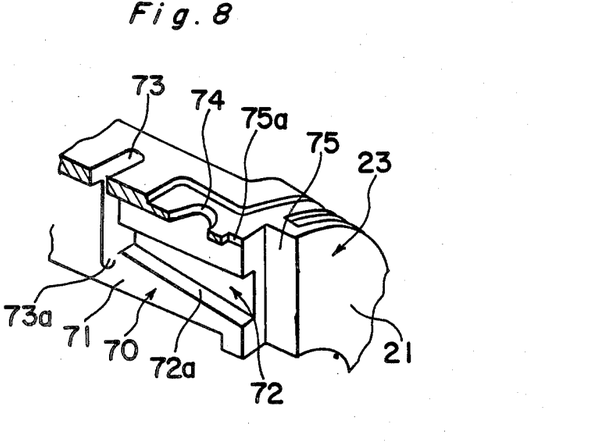
FIG. 8 is a perspective view of that portion of the cylinder block shown in FIG. 7.

For accommodating the locking link 33, one end portion of the cylinder block 21 has a slit-like groove 70 extending radially outwardly from the cylinder chamber 46 and terminating inwardly adjacent the outer periphery of said one end portion of the cylinder block 21, said groove 70 being defined by a pair of opposite walls 71 which are spaced a distance slightly larger than the thickness of the locking link 33. As best shown in FIGS. 7 and 8, one of the opposite walls 71 defining the groove 70 therebetween has a guideway 72 extending in a direction generally parallel to the longitudinal axis of the cylinder chamber 46 from a portion of the annular end face of the cylinder block 21 and terminating at a position corresponding to a substantially intermediate portion of the cylinder chamber 46. The wall defining the guideway 72 radially adjacent the cylinder chamber 46 is diagonally upwardly sloped at 72a in a direction facing the intermediate chamber 47 for the purpose as will become clear from the subsequent description. Each of the walls 71 is also formed with a radially inwardly extending bearing recess 73a. The guide way 72 and the bearing recess 73a both defined in the wall 71 defining the groove 70 are so shaped and so positioned relative to each other that, as the locking link 33 is inserted into the groove 70 from above the plug end cap 40 prior to the decorative covering 43 being rigidly secured to the end of the cylinder block 21, the bearing pin 65 on the locking link 33 can be guided in the guideway 72 while sliding along the corresponding sloped walls 72a until they fall into the bearing recess 73a as shown in FIG. 6. When the locking link 33 is held in position within the groove 70, the pawls 66 and 67 integral with the locking link 33 are respectively positioned adjacent one of the side plates, for example, the side plate 28c, of the slide member 28 and one end of the barrel 25 opposite to the cam member 24, the details of which will be described later. The lock housing 23 including the slit-like groove 70, the guideway 72 on the wall 71 defining the groove 70 and the recess 73a is formed in one-piece construction by the use of any known mold casting technique.

The locking link 33 so positioned inside the groove 70 is pivotable between operative and inoperative positions about the bearing pin 65 in a plane perpendicular to the longitudinal axis of the barrel 25 and also to the direction of movement of the slide member 28 between the locked and unlocked positions. When the mating key 36 is not inserted into the groove 25a in the barrel 25, the link 33 is biased to the inoperative position as shown by the chain line X in FIG. 6 by the action of the biasing spring 35. The biasing spring 35 is in the form of a compression spring having one end engaged in the bearing recess in the locking link 33 and the other end positioned in a mounting hole 74 defined in a portion of the wall of the cylindrical block 21 which is radially aligned with the groove 70, a substantially intermediate portion of said biasing spring 35 extending radially of the cylindrical block 21 within the groove 70 and between the walls 71 defining the groove 70. This biasing spring 35 is held in position by an axially protruding flange portion 43a of the decorative covering 43 which is secured to that end portion of the cylindrical block 21 so as to overlay the other end of the biasing spring 35 as best shown in FIG. 6.

It is to be noted that the bearing recess 73a for pivotally receiving therein the bearing pin 65 are so sized and so shaped as to permit the bearing pin 65 to be firmly seated in said bearing recess 73a, without any possibility of being separated therefrom, whenever the locking link 33 being pivoted in a manner as will be described later assumes any one of positions including the inoperative position X and the operative position as shown by the broken line Z in FIG. 6.

Figures 9, 10:
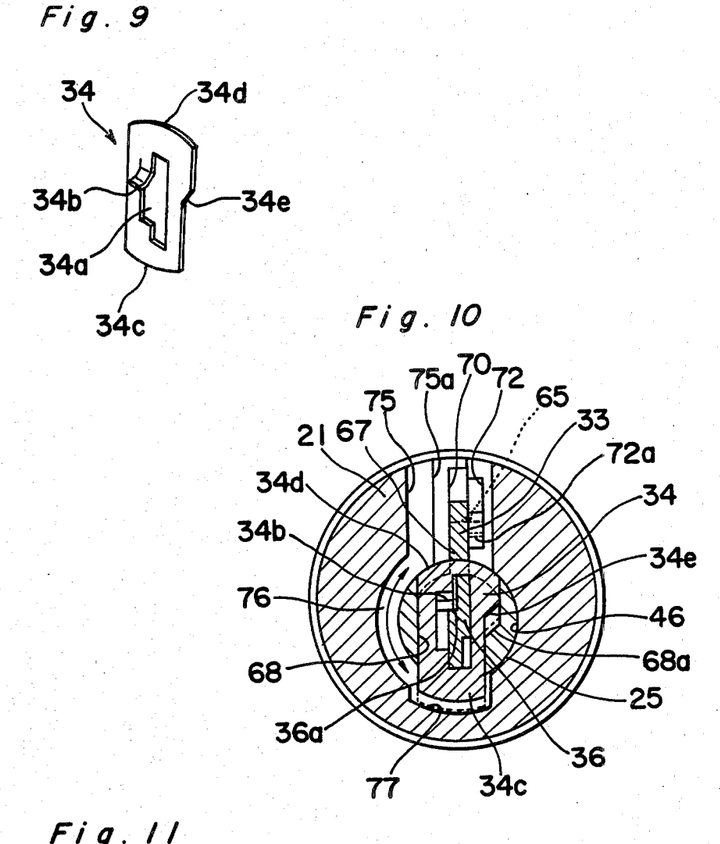
FIG. 9 is a perspective view of a slidable plate used in the cylinder lock of the lock assembly.
FIG. 10 is a cross sectional view taken along the line X—X shown in FIG. 6.

The pivotal movement of the locking link 33 within the groove 70 can be controlled by the slidable plate 34 substantially in response to the insertion and withdrawal of the key 36 into and from the key groove 25a in the barrel 25. As best shown in FIGS. 3, 9 and 10, the slidable plate 34 has its opposite ends rounded at 34c and 34d to respectively conform to the curvature of an arcuate recess 76 in the cylindrical body and the periphery of the barrel 25, respectively, the maximum length of which plate is larger than the diameter of the barrel 25. This slidable plate 34 is formed at a substantially intermediate portion thereof with a slot 34a extending in parallel to the longitudinal extent of said plate 34 and also with a tongue 34b engageable with a lateral ridge 36a formed in the key 36 so as to extend in a direction parallel to the longitudinal extent of said key 36 as best shown in FIGS. 3 and 6. This tongue 34b extends from one peripheral edge portion of the slot 34a adjacent the rounded end 34d a certain distance in a direction towards the rounded end 34c and is gently bent to protrude in a direction generally perpendicular to the plane of one surface of the slidable plate 34 while partially covering the slot 34a as best shown in FIG. 9. By the reason as will become clear from the subsequent description, a portion of one side edge of the slidable plate 34 adjacent the rounded end 34d is formed integrally with a lateral flange with a step defined at 34e.

This slidable plate 34 is operatively carried by the barrel 25 in a manner as will now be described. As best shown in FIG. 3, the barrel 25 forming a part of the cylinder lock key plug C has a guide groove 68 defined therein at a position adjacent the capped end thereof and remote from the cam member 24 and extending from a portion of the periphery thereof to the opposite portion of the same in a direction radially of the barrel 25 while traversing the key groove 25a in the barrel 25. As shown in FIGS. 6 and 10, the slidable plate 34 is loosely accommodated within the guide groove 68 with the tongue 34b situated in the key groove 25a and pointed towards the direction of insertion of the mating key 36. With the slidable plate 34 so accommodated in the guide groove 68 in the barrel 25, the slidable plate 34 is urged to an engaged position, as shown by the phantom line in FIG. 10 by the action of the biasing spring 35, the biasing force of which is transmitted to said slidable plate 34 through the locking link 33 because the pawl 66 of the locking link 33 is, in the assembled condition, constantly engaged to the rounded end 34d of the slidable plate 34. When the slidable plate 34 is in the engaged position as biased by the biasing spring 35 in the manner as hereinabove described, the rounded end 34c of the slidable plate 34 protrudes a certain distance outwardly from the periphery of the barrel 25 and is, while the step 34e in the slidable plate 34 is at the same time engaged to a shoulder 68a defined in the guide groove 68, engaged in a detent recess 77 in the inner peripheral wall of the cylinder chamber 46, to hold the barrel 25 against rotation.

However, this slidable plate 34 can be moved from the engaged position towards a disengaged position against the biasing force of the biasing spring 35 transmitted thereto by means of the pawl 66, as the mating key 36 is inserted into the key groove 25a in the barrel 25. More specifically, as the mating key 36 is inserted into the key groove 25a through the key hole in the end cap 40, the slidable plate 34 is moved in a direction towards the locking link 33, or upwardly as viewed in FIGS. 6 and 10, with the tongue 34b riding on the lateral ridge 36a in the mating key 36 being inserted. The disengaged position of the slidable plate 34 is shown by the solid line in FIG. 10 and, in this condition and so long as the slide member 28 is held in the locked position as shown in FIGS. 4 and 5, the locking lever 33 assumes a floated position as shown by the solid line in FIG. 6 by the reason as will now be described.

As best shown in FIGS. 5 and 6, while the locking lever 33 is held in position within the groove 70 with the pawl 66 constantly engaged to the rounded end 34d of the slidable plate 34 by the action of the biasing spring 35 as hereinbefore described, the pawl 67 opposite to the pawl 66 is slidingly engaged to a lateral outer surface of the side plate 28c of the slide member 28. This pawl 67 is engageable into a detent recess 61 defined in the side plate 28c at a position adjacent the top plate 28d of the slide member 28 so that, when the pawl 67 is engaged thereinto incident to the pivotal movement of the locking lever 33 to the operative position shown by the broken line Z in FIG. 6, the slide member 28 can be locked in the unlocked position so long as the mating key 36 remains inserted in the key groove 25a in the barrel 25. The engagement of the pawl 67 into the detent recess 61 in the side plate 28c of the slide member 28 takes place when the slide member 28 in the locked position as shown in FIGS. 4 and 5 is moved to the unlocked position by the rotation of the cylinder lock key plug C, that is, the barrel 25 with the mating key 36 inserted in the key groove 25a. This is because, as hereinbefore described, the rotation of the cylinder lock effected as a result of the turning of the mating key 36 is transmitted to the slide member 28 through the cam projection 58 of the cam member 24 fast with the barrel 25. It is to be noted that, during the rotation of the cylinder lock key plug C with the key 36 inserted into the key groove 25a in the barrel 25, the rounded end 34c of the slidable plate 34 then held in the disengaged position moves in an arcuate cutout 76 defined in the inner wall of the cylinder chamber 46 so as to extend circumferentially of the cylinder chamber 46 in communication with the detent recess 77 as best shown in FIG. 10. It is also to be noted that the detent recess 77 and the arcuate cutout 76 are so defined and so shaped relative to the rounded end 34c of the slidable plate 34 that, whetherever the rounded end 34c of the slidable plate 34 is engaged in the detent recess 77 or in the arcuate cutout 76, any possible axial displacement of the barrel 25 in a direction towards the intermediate chamber 47 can be substantially eliminated or minimized.

While the steering lock embodying the present invention is constructed as hereinbefore described, it operates in the following manner. Assuming that the steering shaft ST is locked by the locking bolt 27 with the slide member 28 held in the locked position as shown in FIGS. 4 and 5 and assuming that the mating key 36 is subsequently inserted into the key groove 25a in the barrel 25, the cylinder lock key plug C is released and the barrel 25 is rotatable by turning the inserted key 36. However, as the mating key 36 is inserted into the key groove 25a, the slidable plate 34 is upwardly shifted from the engaged position towards the disengaged position with the tongue 34b in said slidable plate 34 slidingly riding on the lateral ridge 36a of the mating key 36. On the other hand, since the pawl 67 of the locking lever 33 is engaged to the side plate 28c of the slide member 28 without being engaged in the detent recess 61 so long as the slide member 28 is held in the locked position, the upward shift of the slidable plate 34 as viewed in FIGS. 6 and 10 causes the locking lever 33 to assume the floated position Y without the bearing pin 65 disengaged from the bearing recess 73a.

Subsequent rotation of the inserted key 36 from the "OFF" position to, for example, the "ACC." position results in lowering, as viewed in FIGS. 4 and 5, of the slide member 28 from the locked position towards the unlocked position against the biasing spring 29. This is because the rotation of the inserted key 36 is accompanied by a corresponding rotation of the barrel 25 together with the cam member 24 and the cam projection 58 is brought into engagement with the front edge portion of the base plate 28a of the slide member 28 to lower the latter against the biasing spring 29. As soon as the slide member 28 arrives at the unlocked position, not only is the locking bolt 27 disengaged from the detent recess 20 to unlock the steering shaft ST, but also the pawl 67 on the locking lever 33 is engaged into the detent recess 61 in the side plate 28c of the slide member 28 to lock the latter in the unlocked position with the locking lever 33 assuming the operative position shown by the broken line Z in FIG. 6.

The above description equally applied even when the inserted key 36 is rotated from the "LOCK" position to any one of the "ON" and "START" positions past the "ACC." position.

On the other hand, when the inserted key 36 is rotated in the reverse direction from the "ACC.", "ON" or "START" position back to the "LOCK" position, and unless the inserted key 36 is withdrawn from the key groove 25a in the barrel 25, the steering shaft ST will not be locked and the slide member 28 remains locked in the unlocked position with the locking lever 33 still held in the operative position. However, the subsequent withdrawal of the inserted key 36 from the key groove 25a in the barrel 25 results not only in the locking of the cylinder lock key plug C, but also in the return movement of the locking lever 33 from the operative position Z to the inoperative position shown by the chain line X in FIG. 6 by the action of the biasing spring 35 accompanied by the corresponding return movement of the slidable plate 34 from the disengaged position to the engaged position. The return of the locking lever 33 to the inoperative position X disengages the pawl 67 from the detent recess 61 in the side plate 28c of the slide member 28 and, accordingly, by the action of the biasing spring 29, the slide member 28 is immediately moved upwardly, as viewed in FIGS. 4 and 5, from the unlocked position to the locked position to lock the steering shaft ST.

It is to be noted that, since the rotary switch assembly 32 is of a type known as an automobile iginition switch assembly as hereinbefore described, the details and function of the rotary switch assembly 32 are well known to those skilled in the art. Briefly speaking, when the rotor 52 of the rotary switch assembly 32 is rotated to a position corresponding to the "ACC." position of the key 36, a power control switch provided between an automobile battery source and an automobile electric system including radio, heater, etc. is closed; when the rotor 52 is rotated to another position corresponding to the "ON" position of the key 36, not only is the power control switch closed, but also an iginition switch is closed to bring an automobile iginition system into operation; and when the rotor 52 is rotated to a further position corresponding to the "START" position of the key 36, not only the ignition switch is closed, but also a starter switch necessary to connect the engine cranking motor to the battery source is closed. As is well known to those skilled in the art, the rotary switch assembly 32 has a biasing spring element incorporated therein for biasing the rotor 52 to return automatically to said another position corresponding to the "ON" position of the key 36 after it has been rotated to said further position corresponding to the "START" position and an external force applied to turn the key 36 from the "ON" position to the "START" position has been released. The biasing spring incorporated in the rotary switch assembly 32 acts also on the inserted key 36 through the cam member 24 and, accordingly, the key once moved from the "ON" position to the "START" position can return to the "ON" position immediately after the external force applied to turn the key 36 has been released.

Hereinafter, the manner by which the steering lock of the construction and function as hereinbefore fully described according to the present invention is assembled will be described with particular reference to FIG. 3.

The barrel 25, after the plug end cap 40 has been mounted on the end thereof remote from the cam member 24 and after the tumbler plates 41 and their associated springs 42 have been set in position therein, is inserted into the cylinder chamber 46 past both the switch chamber 48 and the intermediate chamber 47 with the capped end of the barrel 25 protruding outwardly of the cylinder block 21 from the open end thereof opposite to the switch chamber 48 and until the stopper projection 25b fast with the barrel 25 and the cam projection 58 abut respectively against the semi-circular indent 79 and the annular land 78. Then, while the locking bolt 27 is inserted into the guide opening 26 with the anchor 54 pointed towards the intermediate chamber 47 in a direction perpendicular to the longitudinal extent of the barrel 25, the slide member 28 and the biasing spring 29 are inserted into the intermediate chamber 47 through the switch chamber 48. During the insertion of the slide member 28 into the intermediate chamber 47 together with the biasing spring 29, care is required to allow the anchor 54 fast with the locking bolt 27 and protruding into the intermediate chamber 47 to be received in the U-shaped engagement recess 56 in the top plate 28d of the slide member 28 to connect the locking bolt 27 with the slide member 28 so that the both can move together, and also to allow the cam body 60 to pass through the space 28e defined in the slide member 28.

After the drive device 30 has been set in position inside the intermediate chamber 47, the partition wall member 31 is fixed in position between the intermediate and switch chambers 47 and 48 to the inner wall of the cylinder block 21. Subsequent to the setting of the partition wall member 31, the rotary switch assembly 32 is inserted into the switch chamber 48 in such a manner as to allow the actuator projection 51 of the cam member 24 fast with the barrel 25 to be exactly engaged into the engagement recess 52a in the rotor 52 of the rotary switch assembly 32 and, then the terminal base 49 is secured to the cylindrical block 21 to close the open end of the cylindrical block 21 adjacent the switch chamber 48 and also to firmly set the switch assembly 32 in position inside the switch chamber 48.

By so doing, the cylinder lock key plug C, the slide member 28, the locking bolt 27 and the switch assembly 32 are all set in position inside the axial bore in the cylindrical block 21, all of which are mounted successively into the axial bore in the cylindrical block 21 in a direction from the open end of the block 21 adjacent the switch chamber 48.

Thereafter, the slidable plate 34, the locking lever 33 and the biasing spring 35 are successively set in position, followed by the mounting of the decorative covering 43. Specifically, the insertion of the slidable plate 34 into the guide groove 68 in the barrel 25 is carried out via a radial guide groove 75 defined in the annular end face of the cylinder block 21 adjacent the outer end of cylinder chamber 46 and extending from the outer periphery of recess 77 across key groove 25a to the outer periphery of that end portion of the cylinder block 21. It is to be noted that, in view of the particular shape of the slidable plate 34 with the tongue 34b protruding perpendicular to the body of the plate 34, the radial guide groove 75 has a radial gutter 75a so shaped and so sized as to allow the tongue 34b to pass therethrough when the slidable plate 34 being inserted is guided along the radial groove 75 towards the guide groove 68 in the barrel 25.

After the slidable plate 34 has been set in position, the locking lever 33 is inserted into the groove 70 from the open end of the cylinder block 21 adjacent the cylinder chamber 46. During the insertion of the locking lever 33 into the groove 70, a simple push while the locking lever 33 is pointed with the pawl 67 oriented towards the groove 70 is sufficient to allow the locking lever 33 to be set in position inside the groove 70 because the bearing pin 65 laterally protruding from the locking lever 33 is guided deep into the groove 70 along the guideway 72 while slidingly moving along the sloped walls 72a until it falls into the bearing recess 73a. Subsequently, the biasing spring 35 is inserted through the mounting hole 74 until the leading end of the spring 35 with respect to the direction of insertion thereof is engaged in the bearing recess 33b on the lateral edge 33a of the locking lever 33.

The final procedure is to mount the decorative covering 43 on the end portion of the cylindrical block 21. At this time, care is required to avoid any possible jump of the biasing spring 35 out of the mounting hole 74. For this purpose, during the mounting of the decorative covering 43 on the end portion of the cylinder block 21, the biasing spring 35 must be axially inwardly compressed to allow the axial flange 43a to pass over the other end of the spring 35 situated within the mounting hole 74 prior to the free end of the axial flange 43a crimped to the outer periphery of the cylinder block 21.

It is to be noted that, at the time of completion of the assembly of the steering lock embodying the present invention, the cylinder lock key plug C is held in the "LOCK" position and, accordingly, the slide member 28 is held in the locked position.

From the foregoing full description of the present invention, it has now become clear that the steering lock can be manufactured with a minimized number of component parts which brings advantageously about reduction in size and weight of the overall steering lock. Specifically, according to the present invention, not only is the necessity of the discrete outer hollow cylinder or sleeve for the fixed cylinder part of the cylinder lock, which has heretofore been required in the prior art cylinder lock, eliminated since the wall of the cylinder block 21 surrounding the barrel 25 serves the purpose, but also the one-piece construction of the barrel 25 with the cam member 24 is effective to substantially eliminate any possible generation of rattling or clattering noises, which would occur if they are made of separate members as is the case with the conventional steering lock, and also to minimize the number of component parts to be assembled together.

Although the present invention has fully been described in connection with the preferred embodiment thereof with reference to the accompanying drawings, it is to be noted that various changes and modifications are apparent to those skilled in the art. By way of example, it is possible to employ a leaf spring instead of the biasing spring 35, in which case the mounting hole 74 may not be necessary.

Such changes and modifications are to be understood as included within the true scope of the present invention unless they depart therefrom.

We claim:

1. A steering lock which comprises, in combination:
   a lock housing including a cylinder block having an axial bore defined therein, said axial bore being constituted by first and second cavities axially aligned with each other, and a mounting block extending generally laterally outwardly from the cylindrical block and having a guide opening defined therein in communication with the first cavity;
   a locking member supported movably in said guide opening for locking and unlocking an automobile steering shaft;
   a cylinder lock plug operatively substantially housed in an axially non-movable fashion within the second cavity adjacent one end of the cylinder block and including a barrel, said barrel having an axially extending key groove defined therein for receiving a mating key, said barrel being rotatable through a predetermined angle between inoperative and operative positions about the longitudinal axis thereof only when the mating key inserted in said key groove is turned, said barrel including means for holding the barrel in the inoperative position in the absence of the mating key in the key groove, but for permitting the barrel to be rotatable after the insertion of the mating key in the key groove, said holding means having a capability of discriminating whether or not the mating key inserted in the key groove is correct and acceptable to the cylinder lock and accepting only the correct and acceptable key;

means coupled with said locking member for driving said locking member and housed in the first cavity for movement between locked and unlocked positions to cause the locking member to lock and unlock the steering shaft, respectively, said driving means being moved from the locked position towards the unlocked position in response to the rotation of the barrel from the inoperative position towards the operative position and also moved from the unlocked position towards the locked position in response to the rotation of the barrel from the operative position towards the inoperative position;

means operatively coupling said barrel and said driving means;

means for biasing the driving means to assume the locked position; and a retaining mechanism for retaining the driving means in the unlocked position once the driving means has been moved to the unlocked position and so long as the mating key inserted in the key groove is left unremoved therefrom even though the barrel has subsequently been rotated from the operative position back to the inoperative position, but for releasing the driving means from the unlocked position to allow said driving means to move towards the locked position by the action of said biasing means upon withdrawal of the inserted key from the key groove, said retaining mechanism comprising a locking lever having a bearing pin extending from a substantially intermediate portion thereof in at least one direction perpendicular to the locking lever, said cylinder block having a bearing for said pin to which said pin has access from only said one end of said cylinder block said locking lever being displaceable to assume first, second and third operative positions, a biasing spring for urging the locking lever in one direction about the bearing pin, and means controllable by the mating key for permitting the locking lever to assume the first operative position during the absence of the mating key in the key groove and for causing the locking lever to assume any one of the second and third operative positions against the biasing spring depending on the position of the driving means during the presence of the mating key in the key groove, said locking lever being engaged with the driving means to lock the driving means in the unlocked position when in the second position and disengaged from the driving means when in any one of the first and third positions;

said cylinder block having an elongated chamber defined therein and extending axially of the cylinder block in communication with the second cavity, said second cavity and said elongated chamber each having first and second open ends at the opposite ends of said second cavity with respect to each other which are open at annular end faces on the cylinder block opposite from the first cavity and towards the first cavity, respectively, said locking lever being displaceably held in position inside the elongated chamber by insertion through the first open end in a direction axially thereof along the longitudinal extent of the cylinder block.

2. A lock as claimed in claim 1, wherein a wall defining the elongated chamber in the cylinder block has defined therein a bearing recess for loosely and pivotally supporting the bearing pin and a sloped wall of said recess extending from the first open end of the elongated chamber so as to diverge radially outwardly of the second cavity in a direction towards the second open end of the elongated chamber and terminating in communication with the bearing recess, said sloped wall providing a guide along which the bearing pin moves until it falls into the bearing recess during the insertion of the locking link into the elongated chamber.

3. A lock as claimed in claim 2, wherein said barrel has a cam member integrally formed with the barrel, said cam member transmitting the motion of the barrel to the driving means.

4. A lock as claimed in claim 3, further comprising a make-up covering means having a perforation defined therein, said covering means being rigidly mounted on said one end of the cylinder block with said first end of the barrel aligned with and exposed through said perforation to the outside of the lock housing, and wherein said cylindrical block has a mounting hole defined therein in a radial direction and communicated to the elongated chamber, said mounting hole being closed by a portion of the covering means after the biasing spring has been inserted into the elongated chamber through said mounting hole with the opposite ends of said biasing spring engaged in the mounting hole and with the locking link, respectively.

5. A lock as claimed in claim 4, wherein said driving means is movable in a direction perpendicular to the longitudinal axis of the barrel and wherein said cam member is constituted by a cam rod and a cam projection protruding from the cam rod in a direction radially outwardly of the barrel, said cam projection being so shaped as to permit the driving means to be moved in contact therewith in response to the rotation of the barrel.

6. A lock as claimed in claim 5, further comprising a partition wall member held in position inside the first cavity and dividing the first cavity into two compartments and a key-operated electric switch assembly secured in position inside one of said compartments adjacent the other end of the cylindrical block, said switch assembly being operatively coupled to the cam rod and capable of assuming at least first and second switching conditions when the barrel is in the inoperative and operative positions, respectively, and wherein said driving means is accommodated within the other of said compartments and is movably guided along the partition wall member.

7. A lock as claimed in claim 6, wherein a radially extending shoulder region is defined between the second cavity and said other of the compartments and further comprising means for restraining the barrel from being axially displaced in a direction away from the first cavity, said restraining means comprising a detent projection integral with the barrel and protruding radially outwardly from a second end of the barrel adjacent the cam member, said detent projection being engaged in said shoulder region.

8. A lock as claimed in claim 3, 4, 5, 6 or 7, wherein said means controllable by the mating key comprises a generally elongated slidable plate selectively engageable with the cylinder block and having a key slot defined therein for the passage of the mating key therethrough during the insertion and withdrawal of the mating key into and from the key groove in the barrel, said slidable plate being carried by said barrel adjcent said first end thereof remote from the cam member, with the key slot aligned with the key groove, for movement between engaged and disengaged positions relative to said block in a direction perpendicular to the longitudinal axis of the barrel, said slidable plate having a length larger than the diameter of the barrel, said slidable plate being normally urged to assume the engaged position by the action of the biasing spring with one end of the locking link engaged with one end of the slidable plate, said slidable plate having a tongue integrally formed therewith and protruding from a portion of the peripheral lip region of the key slot in a direction generally perpendicular to the slidable plate, said tongue being engageable with the mating key, when the mating key is inserted into the key groove through the key slot, to shift the slidable plate from the engaged position towards the disengaged position against the biasing spring.

9. A lock as claimed in claim 8, wherein the inner peripheral edge portion of the cylinder block at said one end thereof has a generally arch-shaped detent cutout, the angle of the arch of said detent cutout corresponding to the predetermined angle through which the barrel rotates, the other end of said slidable plate, which radially outwardly protrudes from the periphery of the barrel, being movably received therein thereby avoiding any possible axial displacement of the barrel in a direction toward the first cavity.

* * * * *